United States Patent [19]

Rosaen

[11] Patent Number: 4,651,570
[45] Date of Patent: Mar. 24, 1987

[54] DIFFERENTIAL PRESSURE MONITOR

[76] Inventor: Borje O. Rosaen, P.O. Box 1085, Ann Arbor, Mich. 48106

[21] Appl. No.: 677,387

[22] Filed: Dec. 3, 1984

[51] Int. Cl.<sup>4</sup> .............................................. G01L 7/16
[52] U.S. Cl. ...................................................... 73/744
[58] Field of Search ..................... 73/744, 745, 746, 38

[56] References Cited

U.S. PATENT DOCUMENTS

| 2,737,804 | 3/1956 | Herzog et al. | 73/38 |
| 3,182,630 | 5/1965 | Claeys | 73/744 |
| 3,429,291 | 2/1969 | Hoffman | 73/744 |

Primary Examiner—Donald O. Woodiel
Attorney, Agent, or Firm—Gifford, Groh, VanOphem, Sheridan, Sprinkle and Dolgorukov

[57] ABSTRACT

The present invention provides a differential pressure monitor having an elongated housing defining an elongated interior chamber. A piston is axially slidably mounted within the chamber and divides the chamber into two subchambers, each of which are fluidly connected to a fluid system. A compression spring resiliently urges the piston in one axial direction in the chamber while an arm abuts against the piston and provides an exteriorly visible signal of the position of the piston within the chamber and thus of the differential pressure between the subchambers.

6 Claims, 3 Drawing Figures

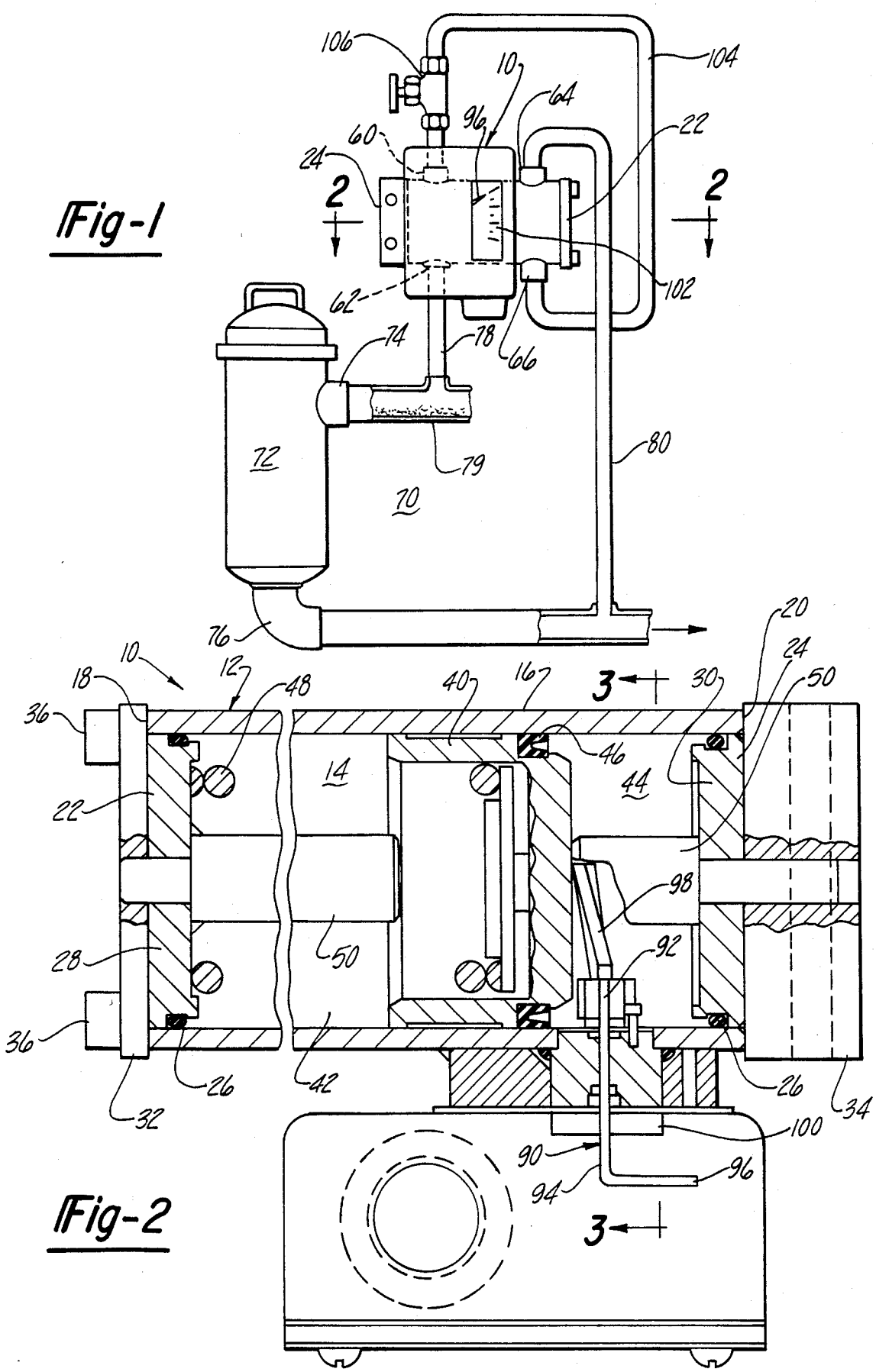

DIFFERENTIAL PRESSURE MONITOR

BACKGROUND OF THE INVENTION

I. Field of the Invention

The present invention relates to a differential pressure monitor.

II. Description of the Prior Art

There are a number of previously known monitors for measuring a differential pressure between two fluid ports. Many of these previously known devices use diaphragms for small differential pressure values and relatively small pistons for higher pressure values, i.e. differential pressures in excess of 10 psi. Low pressure differentials require correspondingly large areas to insure reliability of monitor performance, but the diaphragm constructions available are not compatible with many of the fluids used.

A still further disadvantage of these previously known fluid pressure monitors is that such monitors become damaged if system pressures exceed a relatively low amount. Monitors with adequate differential areas for use with higher pressures and/or corrosive or otherwise difficult fluids have not been available.

A still further disadvantage of these previously known differential fluid pressure monitors is that it is difficult, if not altogether impracticable to clean the moving parts in cases where fluids carry solids or other ingredients which tend to clog and prevent reliable operation.

A still further disadvantage of the previously known monitors is that such prior devices do not include any convenient means for bleeding air from the monitor. Air within the monitor, however, results in inaccurate readings, and with many fluids cause drying, hardening, and subsequent interference with monitor performance.

SUMMARY OF THE PRESENT INVENTION

The present invention provides a differential pressure monitor which overcomes all of the above mentioned disadvantages of the previously known devices.

In brief, the monitor of the present invention comprises an elongated housing having a tubular main body and covers which close each end of the main body. Thus, the main body together with the covers define an elongated interior housing chamber.

A piston is axially slidably mounted within the housing chamber and thus divides the housing chamber into two subchambers. These subchambers are fluidly connected to the fluid system across a fluid user device so that the fluid differential pressure between the subchambers equals the differential pressure across the user device.

A compression spring is sandwiched in between the piston and one cover and resiliently urges the piston towards the subchamber in which the higher fluid pressure is anticipated. Consequently, the axial position of the piston within the housing chamber is indicative of the differential pressure between the subchambers. An indicator assembly, visible exeriorly of the housing, is mechanically connected with the piston to provide a signal with the axial position of the piston and thus of the differential pressure between the subchambers.

Preferably, at least one of the covers is detachably secured to the housing main body which enables the compression spring to be replaced with a new compression spring having a different spring constant. By doing this, the pressure range of the monitor can be varied as desired. In addition, a pair of stops limits the movement of the piston and thus protects the monitor against the damage which would otherwise result from unexpectedly high differential pressures.

Preferably, a conduit having a shut off valve fluidly connects the subchambers together. When opened the valve permits fluid flow through the subchambers and bleeds any air entrapped within the monitor to the effluent from the user device.

BRIEF DESCRIPTION OF THE DRAWING

A better understanding of the present invention will be had upon reference to the following detailed description, when read in conjunction with the accompanying drawings wherein like reference characters refer to like parts throughout the several views and in which:

FIG. 1 is a plan view illustrating a preferred embodiment of the present invention installed in a fluid system;

FIG. 2 is a longitudinal sectional view taken substantially along line 2—2 in FIG. 1 and enlarged for clarity.

DETAILED DESCRIPTION OF A PREFERRED EMBODIMENT OF THE PRESENT INVENTION

Figure 3:
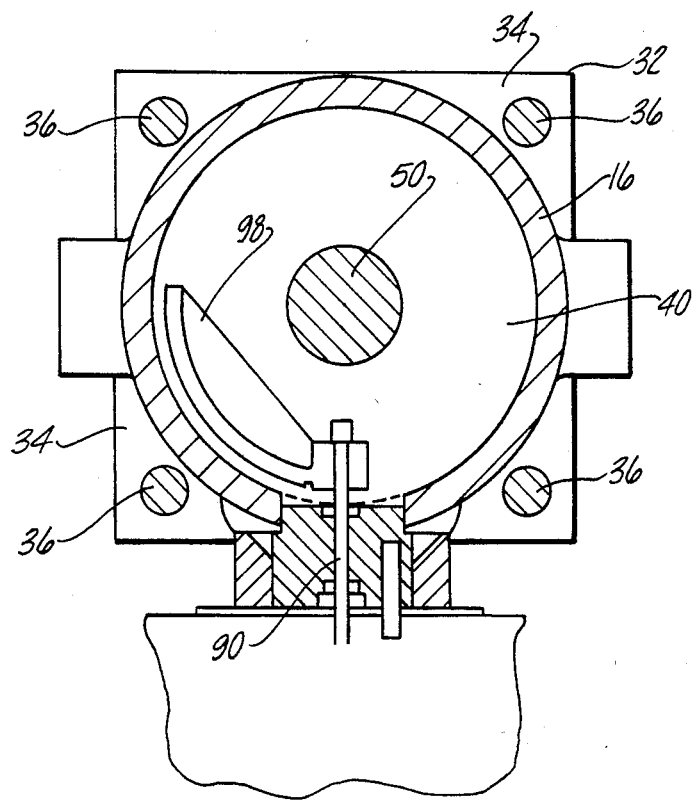
FIG. 3 is a cross-sectional view taken along line 3—3 in FIG. 2.

With reference first to FIG. 2, a preferred embodiment of the differential pressure monitor 10 of the present invention is thereshown and comprises an elongated cylindrical housing 12 defining an elongated cylindrical housing chamber 14. Although the housing 12 can be constructed in any conventional fashion, it preferably includes a tubular and cylindrical main body 16 which is open at each end 18 and 20. A pair of covers 22 and 24 respectively close the ends 18 and 20 of the housing main body 16 and conventional fluid seals 26 are provided between each cover 22 and 24 in the housing body 16 in order to prevent fluid leakage.

With reference now to FIGS. 2 and 3, each cover 22 and 24 includes a cylindrical inner portion 28 and 30, respectively, which is positioned within the housing chamber 14 as well as a square outer portion 32 and 34, respectively, which is positioned outside the housing main body 16. Consequently, as best shown in FIG. 3, a part of the square portions 32 and 34 of the covers 22 and 24, respectively, extends radially outwardly from the housing body 16. In order to secure the covers 22 and 24 to the housing body 16, four bolts 36 slidably extend through the first cover 22 and threadably engage threaded bores in the second cover 24 so that, upon tightening, the bolts 36 secure the covers 22 and 24 together as well as to the housing body 16.

Referring again, to FIG. 2, a piston 40 is axially slidably positioned within the housing chamber 14 and divides the housing chamber 14 into two subchambers 42 and 44. An annular seal 46 carried by the piston 40 prevents fluid leakage between the housing subchambers 42 and 44. A helical compression spring 48 is also entrapped between one side of the piston 40 and the housing cover 22 and thus urges the piston 40 towards the subchamber 44.

Still referring to FIG. 2, an elongated cylindrical stop 50 is attached to each cover 22 and 24 so that the stops 50 extend axially towards each other and thus extend into the housing chamber 14. These stops register with opposite sides of the piston 40 and limit the axial travel of the piston 40 to predetermned limits for a reason to be subsequently described.

With reference now particularly to FIG. 1, a pair of conventional fluid ports 60 and 62 are formed in the housing body 16 and are open to the subchamber 44. Similarly, a second pair of ports 64 and 66 are formed in the housing body 16 and these ports 64 and 66 are open to the other housing subchamber 42. These ports 60-66 include conventional fluid fittings.

Still referring to FIG. 1, the monitor 10 is adapted for connection to a fluid system 70 having a fluid device 72, such as a filter, having an inlet 74 and an outlet 76. The housing port 62 is fluidly connected by a conduit 78 to the device inlet 74 and, similarly, the port 64 is fluidly connected by a conduit 80 to the outlet 76 of the device 72.

In the well known fashion, the pressure at the inlet 74 of the device 72 is greater than the pressure at its outlet 76. Furthermore, in the event that the device 72 is a fluid filter, this differential pressure between the device inlet 74 and the outlet 76 will increase as the filter becomes increasingly clogged. Since the device inlet 74 is fluidly connected to the monitor subchamber 44 by the conduit 78, the pressure in the subchamber 44 exceeds the pressure in the monitor subchamber 42 thus urging the piston 40 against the force of the compression spring 48. Consequently, the axial position of the piston 40 within the housing chamber 14 is representative of the differential pressure between the housing subchambers 42 and 44. In addition, the conduit 78 is preferably connected through the top of the conduit 79 to the device inlet 74, so that the flow of debris into the monitor chamber 14 is minimized.

With reference now particularly to FIGS. 2 and 3, in order to indicate the position of the piston 40 in the housing chamber 14, and thus indicate the differential pressure between the housing subchambers 42 and 44, a shaft 90 is rotatably mounted to the housing body 16 so that one end 92 of the shaft 90 is positioned within the housing subchamber 44 while its other end 94 is positioned exteriorly of the housing 12. A needle 96 is secured to the end 94 of the shaft 90 while an arm 98 is attached to the shaft end 92 and abuts against the piston 40, as shown in FIG. 2, so that the rotation postion of the shaft 90, and thus the position of the needle 96 is representative of the axial position of the piston 40 within the housing chamber 14. A torsion spring assembly 100 (FIG. 2), maintains the arm 98 in abutment with the piston 40 while the needle 96 cooperates with an indicia scale 102 (FIG. 1). The shaft 90 also can be used to operate electrical switches (not shown) to permit remote automatic monitoring.

Referring again to FIG. 1, a fluid conduit 104 having a valve 106 in series with it fluidly connects the fluid ports 60 and 66 together. The valve 106 is closed during normal operation of the monitor 10 so that no fluid flow occurs through the conduit 104. In some cases, however, it is desirable to purge any air that may be contained within the monitor 10. Thus, to purge the air from the monitor 10, the valve 106 is opened thus permitting fluid flow directly from the device inlet 74, through the housing subchambers 44 and 42 and then through the conduit 80 to the device outlet 76. When the air has been purged, the valve 106 is again closed thus restoring normal operation to the monitor 10.

From the foregoing, it can be seen that the differential pressure monitor of the present invention provides several advantages. One advantage of the monitor 10 of the present invention is that it is simple and relatively inexpensive in construction allowing relatively large pistons and high spring forces to allow monitoring of differential pressures over a wide range of system pressures.

A still further advantage of the present invention is the provision of the stops 50 which limit the axial travel of the piston 40 within the housing chamber 14. Thus, in the event of an unexpectedly high differential pressure between the housing subchambers 42 and 44, the stops 50 abut against the piston 40 thus limiting its travel and preventing damage to the components of the monitor 10.

A still further advantage of the monitor 10 of the present invention is that, since the cover 22 is detachable from the housing body 16, cleaning of the internal spaces can be easily and rapidly accomplished. Such ease of cleaning allows monitoring of systems with fluids not previously suitable.

A still further advantage of the present invention is the provision of the conduit 104 with its valve 106 for purging air from the monitor 10. Such an air purge is highly desirable where the fluid system 70 contains a fluid which reacts to air.

Having described my invention, however, many modifications thereto will become apparent to those skilled in the art to which it pertains without deviation from the spirit of the invention as defined by the scope of the appended claims.

I claim:

1. A differential pressure monitor for a fluid system, said monitor comprising:
    an elongated housing defining a chamber;
    a piston axially slidably mounted in said chamber, said piston dividing said chamber into two subchambers;
    means for resiliently urging said piston in one axial direction;
    means for indicating the axial position of said piston in said chamber exteriorly of said housing, said means comprising a shaft rotatably mounted to said housing about an axis substantially perpendicular to the axis of said housing, said shaft having a first end positioned in said chamber and a second end positioned outside of said housing, an arm secured to said first shaft and having a portion which abuts against an end of said piston, and an indicator secured to the second end of said shaft;
    means for fluidly connecting one subchamber to the fluid system; and
    means for fluidly connecting the other subchamber to the fluid system;
    wherein said housing comprises an elongated and tubular main body, a pair of end covers, means for detachably securing at least one end cover across one end of said main body, and wherein said resilient means comprises a spring sandwiched between said one end cover and said piston.

2. The invention as defined in claim 1 and comprising means for purging air from said chamber.

3. The invention as defined in claim 2 wherein said air purging mean comprises means for selectively directly fluidly connecting said subchambers together.

4. The invention as defined in claim 3 wherein said direct fluid connecting means comprises a pair of fluid ports, one fluid port being open to each subchamber, a fluid conduit fluidly connecting said ports together, and a valve connected in series with said conduit.

5. The invention as defined in claim 1 and comprising means for limiting the axial movement of said piston between predetermined limits.

6. The invention as defined in claim 5 wherein said limiting means comprises a pair of stops, one stop being secured to each cover and said stops extending axially inwardly from said covers and into said chamber.

* * * * *